United States Patent [19]

Rudich, Jr.

[11] 3,976,925
[45] Aug. 24, 1976

[54] INTEGRAL MOTOR CONTROLLER

[75] Inventor: George Rudich, Jr., Goshen, Ind.

[73] Assignee: Johnson Controls, Inc., Milwaukee, Wis.

[22] Filed: Mar. 25, 1975

[21] Appl. No.: 561,891

[52] U.S. Cl. ............................... 318/257; 318/624
[51] Int. Cl.² ......................................... G05B 13/02
[58] Field of Search ........... 318/257, 565, 624, 641, 318/678, 681

[56] References Cited
UNITED STATES PATENTS

| | | | |
|---|---|---|---|
| 3,430,053 | 2/1969 | Westhauer | 318/624 X |
| 3,686,557 | 8/1972 | Futamuka | 318/678 X |
| 3,704,404 | 11/1972 | Iversen | 318/624 X |
| 3,895,287 | 7/1975 | Sun et al. | 318/624 X |

Primary Examiner—Robert K. Schaefer
Assistant Examiner—W. E. Duncanson, Jr.
Attorney, Agent, or Firm—Johnson, Dienner, Emrich & Wagner

[57] ABSTRACT

An integral motor controller circuit for supplying variable speed, bidirectional drive to a motor as a function of variations of a sensed parameter includes an amplifier circuit which is responsive to an error signal indicative of deviations of the parameter from a set point to provide an output signal representing the direction and amount of the deviation. The amplifier output signal is applied to a first motor terminal and to an input of a two-level comparator circuit which is responsive to an increasing error signal exceeding a predetermined amount to connect an energizing potential of one polarity to a second motor terminal and responsive to a decreasing error signal in excess of the predetermined amount to connect an energizing potential of the opposite polarity to the second terminal of the motor, the speed of the motor being determined by the level of the amplifier output signal. The motor controller is described with reference to an application in an environmental control system to effect positioning of a damper located in an air duct for supplying heated or cooled air to an area in response to changes in the air temperature in the area.

21 Claims, 3 Drawing Figures

INTEGRAL MOTOR CONTROLLER

BACKGROUND OF THE INVENTION

1. Field of the Invention

This invention relates to motor actuator circuits, and more particularly, to an integral motor controller circuit which controls motor speed and the direction of rotation of the motor shaft as a function of changes in a sensed parameter.

2. Description of the Prior Art

Motor control circuits are employed in analog control systems for controlling a motor which controls system apparatus to maintain a variable system parameter at a predetermined set point value. The motor controller circuit is responsive to an input signal representing deviations of the parameter from the set point to supply drive signals to the motor. The motor in turn controls apparatus of the system to correct for the error.

One example of the use of a motor controller circuit is in an environmental control system wherein a reversible motor drives a damper actuator which controls dampers located in air ducts supplying warm and cool air to an area or room to position the dampers as a function of the temperature in the area as sensed by a temperature sensor. The motor effects repositioning of the dampers to permit warm or cool air to be supplied to the area as needed to compensate for the change in temperature.

In known systems, the motor controller circuit supplies a fixed drive to the motor such that is driven at a constant speed which enables effective compensation for average deviations from the set point. However, the correction may be too fast for small deviations and too slow for large deviations. Thus, in the case of large deviations, for example, it may take a long time to return the air temperature in the area to the desired temperature set point. This is undesirable in heating and air conditioning systems where the temperature should be maintained at the set point value, and in the event of a sudden change in load requirements, that a demand for heating or cooling, the temperature should be returned to the set point as quickly as possible to maintain comfort for occupants of the area.

Also, in such systems, a reversible motor is generally required to permit opening and closing of a damper. Thus, the motor controller circuit must provide bi-directional drive to the motor to compensate for positive or negative deviations from the set point.

Therefore, it would be desirable to have a motor controller circuit which provides bi-directional drive to a motor and in which the speed of correction is a function of the amount of deviation from the set point.

SUMMARY OF THE INVENTION

It is therefore an object of the present invention to provide a control system in which the speed of correction for deviations of a system parameter from a set point value is varied in accordance with the magnitude and sense of the deviation of the parameter from the set point value.

Another object of the invention is to provide a control system including a motor controller circuit which provides bi-directional, variable speed drive for a motor as a function of the deviation of a system parameter from a set point.

These and other objects are achieved by the present invention which has provided in a control system, a control circuit controlled by a sensing device which monitors a parameter of the system to provide an output for controlling apparatus of the system to maintain the parameter at a predetermined set point value. The control circuit comprises first means controlled by the sensing device to provide an error signal which varies in amplitude and polarity from a reference value in accordance with changes in the parameter, and a second means responsive to the error signal to effect the connection of a voltage of one polarity to a first output terminal of the control circuit whenever the error signal increases a predetermined amount relative to the reference value and to effect the connection of a voltage of the opposite polarity to the first output terminal whenever the error signal decreases a predetermined amount relative to the reference value. The error signal is extended to a second output terminal of the control circuit whereby the amplitude of the potential difference between the first and second output terminals is proportional to the deviation of the error signal from the reference value, and the polarity of the potential difference between the first and second output terminals is determined by the polarity of the error signal.

In accordance with a disclosed embodiment, the control circuit is used to supply drive signals to a motor such that the speed and direction of rotation of a shaft of the motor are controlled in accordance with deviations of the monitored parameter from the set point value. Thus, when an energizing voltage of one polarity is applied to the motor, the shaft is rotated in one direction, and when an energizing voltage of the opposite polarity is applied to the motor, the shaft is rotated in the opposite direction. The speed of rotation of the shaft is dependent upon the amplitude of the error signal and is thus proportional to the amount of deviation of the monitored parameter from the set point value.

In an exemplary embodiment, the first means of the control circuit includes a bridge network means including the sensing device which provides an error signal whenever the parameter deviates from the set point value, and an amplifier means which amplifies the error signal. The second means includes a two level comparator means which responds to an increase or a decrease in the error signal in excess of a predetermined amount to effect energization of the motor. The comparator means includes means for providing a reference potential which establishes a turnon threshold for the comparator means and feedback means which establishes a turnoff threshold for the comparator means such that the comparator means, once enabled, remains enabled until the error signal decreased a predetermined amount below the turn on threshold for the comparator means. This prevents the system from overshooting the set point and also prevents hunting for a balanced condition by requiring a change in the parameter in excess of a predetermined amount from the set point value before the motor is energized.

Thus, the control system provided by the present invention is able to maintain the monitored parameter at a desired set point, making slow corrections for small deviations from the set point and fast corrections if there is an abrupt change in the value of the parameter.

DESCRIPTION OF A PREFERRED EMBODIMENT

GENERAL DESCRIPTION

Figure 1:
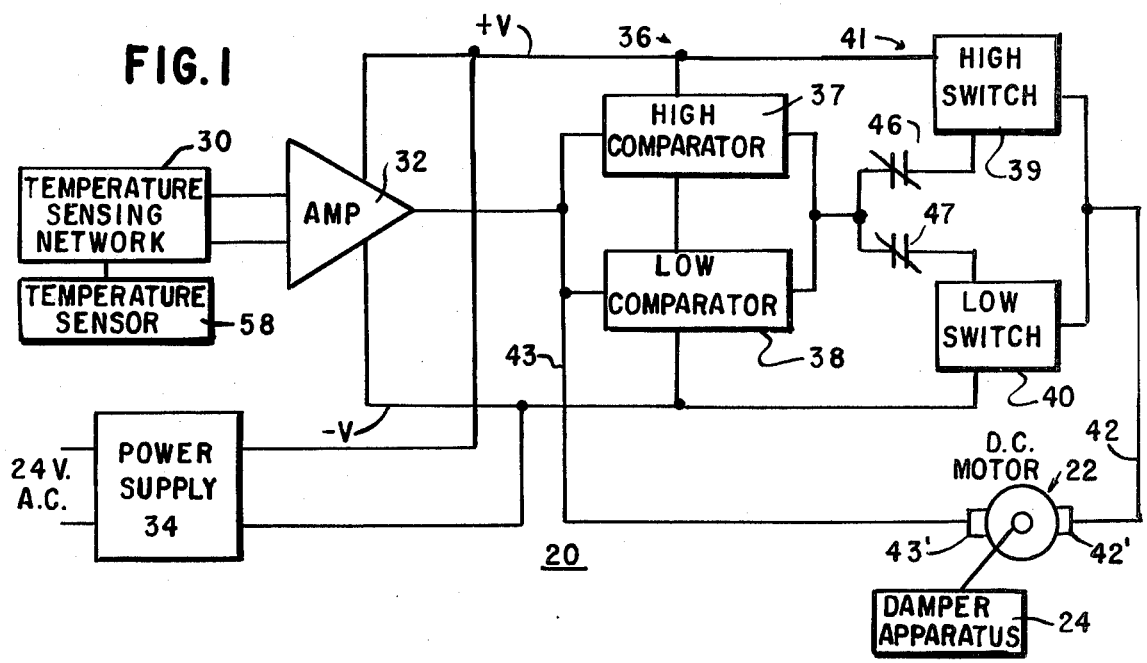
FIG. 1 is a block diagram of an integral motor controller circuit provided by the present invention.

A block diagram of an integral motor controller circuit 20 provided by the present invention is shown in FIG. 1. The motor controller circuit 20 provides bi-directional on-off and speed control for a reversible D.C. motor 22 as a function of deviations of a sensed parameter from a system set point. For small deviations, the motor is operated at a slow speed and in the direction required to correct the error. As the deviation increases, the speed of the motor, and thus the speed of correction, is increased until the motor 22 is energized at maximum rated voltage and thus maximum speed.

By way of illustration, the controller circuit 20 is described with reference to an application in an environmental control system to supply drive to a motor 22 for controlling a damper apparatus 24 which is operable to mix hot and cold air supplied to an area or a room.

The damper apparatus 24 includes a damper actuator (not shown) which controls the positioning of a pair of dampers (not shown) which may be located in hot and cool air ducts, respectively, which supply conditioned air to the area. A temperature sensor 58 located in the area supplies a command signal to the controller circuit 20 to permit positioning of the hot and cold air dampers at a rate proportional to sensed temperature changes in the area. The controller circuit 20 responds to changes in the command signal to maintain the temperature in the area at a set point value, making slow corrections for small temperature changes and fast corrections for relatively large temperature changes.

Referring to FIG. 1, the motor controller circuit 20 includes a temperature sensing network 30, an amplifier circuit 32, a two level comparator circuit 36, an output switching circuit 41, and a power supply 34 which supplies a D.C. potential between a pair of conductors +V and —V.

The temperature sensor 58 is connected in the temperature sensing network 30 which provides an output or error signal indicative of deviations of the temperature in the area from the set point. The error signal is extended to a high gain amplifier 32 which provides an output signal proportional to the sensed temperature.

Whenever the temperature in the area is near the set point, the amplitude of the signal output of the amplifier 32 is normally at a level intermediate the potential supplied to conductors +V and —V by the power supply circuit 34. Whenever the temperature in the area decreases, the output signal of the amplifier 32 increases toward +V, and whenever the temperature in the area increases, the output signal decreases toward the potential of conductor —V.

The signal output of the amplifier 32 is connected via conductor 43 to one terminal 43' of the motor 22. The signal output of amplifier 32 is also supplied to the two level comparator circuit which includes a high comparator circuit 37 and a low comparator circuit 38 which in turn control associated switching circuits 39 and 40, respectively, of the output switching circuit 41. The switching circuit 39 is operable when enabled by the high comparator circuit 37 to connect a terminal 42' of the motor 22 to conductor +V via conductor 42 and resistor R24 to energize the motor 22 to be driven in a first direction for controlling the damper apparatus 24 to position the associated dampers to correct for the deviation in temperature from the set point.

Similarly, the switching circuit 40 is operable when enabled by the low comparator circuit 38 to connect terminal 42' of the motor 22 to conductor —V via conductor 42 and resistor R25 (FIG. 2) for energizing the motor 22 to be driven in the opposite direction.

The speed of the motor 22 is determined by the amplitude of the signal output of amplifier 32 which is extended to terminal 44' of the motor 22. The motor speed is minimum for small deviations and maximum for large deviations with the motor speed increasing as the signal output of amplifier 32 increases in either a positive or negative direction relative to the set point established at the output of the amplifier 32.

As the temperature in the area approaches the set point in response to operation of the dampers, the signal output of amplifier 32 approaches the mid-point of the potential between conductors +V and —V causing the comparator circuit 36, and thus the switching circuit 39 or 40, to be disabled to de-energized the motor 22 when the set point is reached. As will be shown, positive feedback is employed in the comparator circuit 36 to assure sufficient compensation for the deviation and to prevent overshooting of the set point.

As shown in FIG. 1, a pair of limit switches 46 and 47, interposed between the outputs of the comparator circuits 37 and 38 and the inputs of the switching circuits 39 and 40, disconnect power to the motor 22 when the motor shaft reaches preselected limits, providing positive electrical travel limits for the motor shaft.

DETAILED DESCRIPTION OF A PREFERRED EMBODIMENT

Figure 2:
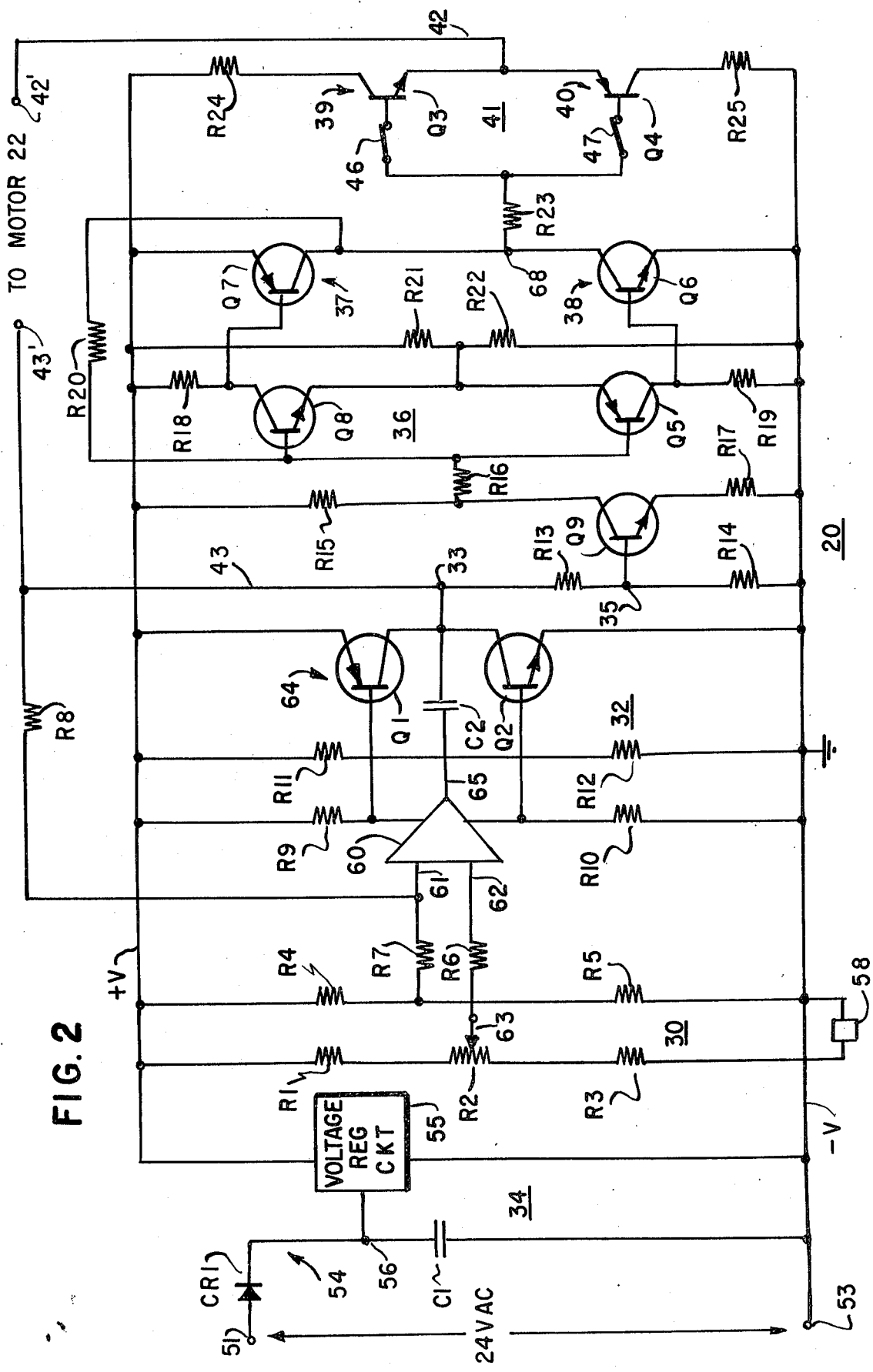
FIG. 2 is a schematic circuit diagram of the integral motor controller shown in FIG. 1.

A schematic circuit diagram of the motor controller circuit 20 is shown in FIG. 2. The power supply circuit 34 comprises a rectifier stage 54 and a regulator circuit 55, such as the type 7824UC, commercially available from Fairchild Semiconductor. The rectifier stage 54 includes a diode CR1 connected between an input terminal 51 of the controller circuit 20 and an input terminal 56 of the voltage regulator circuit 55. A capacitor C1 is connected between input terminal 56 of the regulator circuit and a further input terminal 53 of the controller circuit 20. A 24-volt A.C. signal is supplied to input terminals 51 and 53 of the controller circuit 20, enabling the voltage regulator circuit 55 to provide 18 volts D.C. between conductors +V and —V. In the exemplary embodiment, conductor +V is at 18 volts D.C. and conductor —V is at ground potential.

The temperature sensing network 30 comprises resistors R1–R5, connected to form a bridge network to which the temperature sensor 58 is connected. The temperature sensor 58 may, for example, comprise the type T91 Room Temperature sensing element, commercially available from Penn Controls Division of Johnson Service Company.

Resistors R1–R3 and the temperature sensor 58 are serially connected between conductor +V and ground, and resistors R4 and R5 are serially connected between conductor +V and ground. The sensor 58 incorporates a highly sensitive thermistor sensing element (not shown) that responds immediately to a temperature change providing a change in resistance of the thermistor. The sensor 58 is connected in one leg of the bridge network 30 such that variations in the resistance of the thermistor cause an unbalanced condition for the bridge network 30, providing a D.C. output voltage which is extended to the amplifier circuit 32.

The amplifier circuit 32 comprises a high-gain amplifier 60 an output driver stage 64 including transistor Q1 and Q2. The amplifier 60 may, for example, be the type 741, commercially available from Fairchild Semiconductor, and is connected in a noninverting configuration. Amplifier 60 has a first input 61 connected over a resistor R7 to the junction of resistors R4 and R5 of the bridge network 30. A second input 62 of the amplifier 60 is connected over a resistor R6 to a wiper 63 of potentiometer R2 of the bridge network 30. An output 65 of the operational amplifier 60 is coupled over a capacitor C2 to an output 33 of the amplifier circuit 32. A feedback resistor R8 is connected between the output 33 of the amplifier circuit 32 and an input 61 of the operational amplifier 60.

The bridge network 30 is balanced by adjusting wiper 63 of potentiometer R2 such that the voltage at the output of amplifier 33 is such that the switching circuits 39 and 40 are disabled for a specified resistance of the sensor 58. Any increase or decrease in the resistance of the sensor 58 causes an unbalanced in the bridge network thereby varying the D.C. potential supplied to inputs 61 and 62 of the amplifier 60 causing a resultant increase or decrease in the output signal at point 33.

Transistors Q1 and Q2 form a power drive circuit for the amplifier 32 to provide current to the output terminal 33 for positive and negative going signals, respectively. Transistor Q1 has a base-emitter circuit connected to the positive conductor +V and a collector connected to output 33, and transistor Q2 has a base-emitter circuit connected to ground and a collector connected to terminal 33. The output of the driver stage 64 at terminal 33 is normally one-half the supply voltage, or 9 volts, when the sensed temperature is at the set point. The output of the driver stage 64 is a signal proportional to the sensed temperature and swings from ground to +18 volts in accordance with variations in the error signal supplied to amplifier 32 over the bridge network 30. The change in temperature required to provide the full swing is determined by resistors R4 and R5, which establish a voltage divider network at input 61 of the amplifier 60, and resistors R7 and R8 which establish the gain for amplifier 60.

Figure 3:
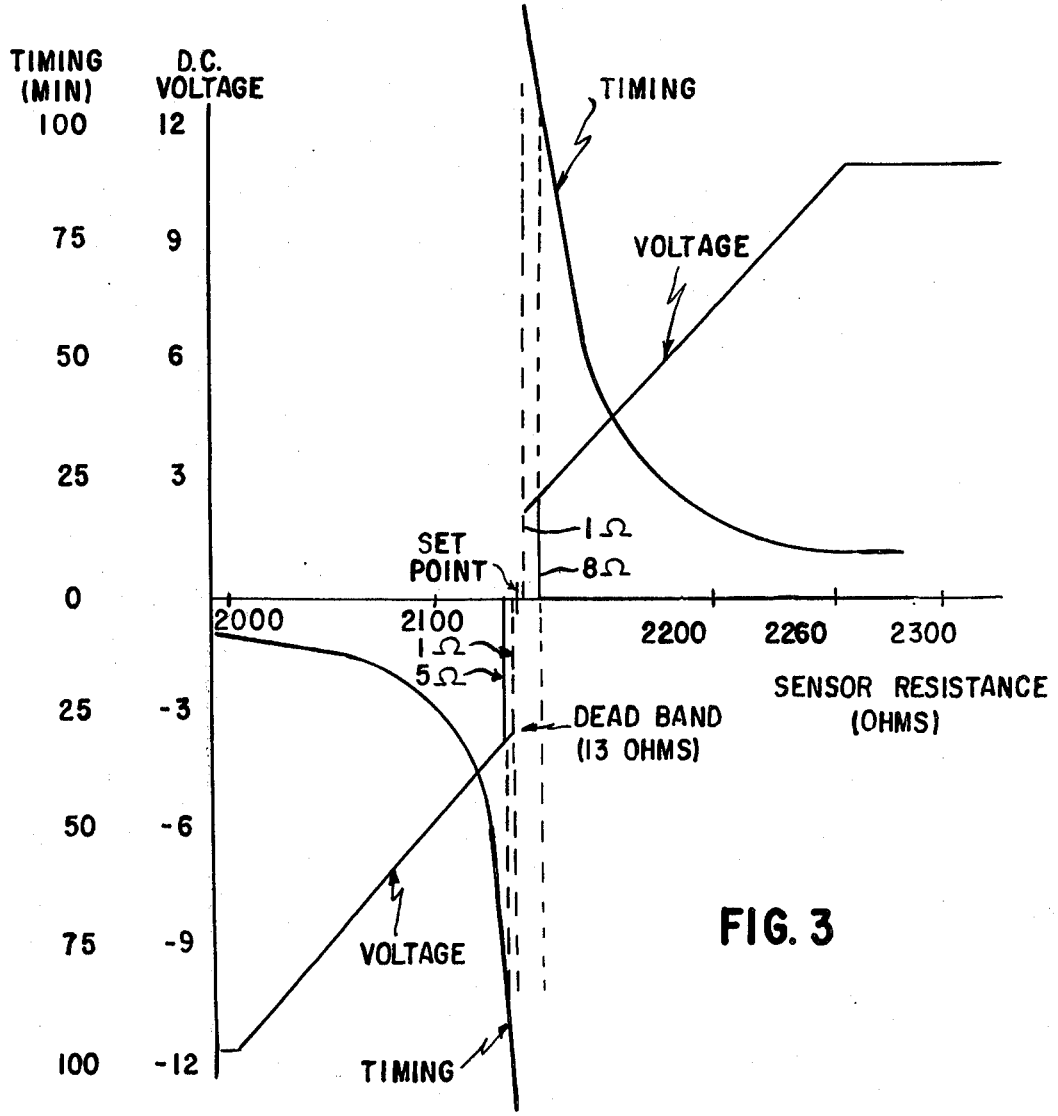
FIG. 3 shows applied voltage and full deflection operating time as a function of the resistance of a sensing device for a motor controlled by the integral motor controller circuit shown in FIG. 2.

The output 33 of the amplifier 32 is connected over conductor 43 to terminal 43' of the motor 32 shown in FIG. 1. The motor 22 is a very slow drive type such as a Barber-Colman FYQM series D.C. reversible motor equipped with a reduction gearing coupled to a worm gear linked to the damper apparatus 24, and having a one-and-a-half-inch stroke. The speed of the motor 22 is varied by varying the drive to the motor in accordance with sensed deviations from the set point as indicated by the change in the potential provided at point 33. In the exemplary embodiment, the motor is energized whenever the deviation exceeds ±0.33° F, as sensed by the sensor 58, to be driven at its slowest rate, at which speed 100 minutes is required for the full one-and-a-half inch stroke. With a sensed deviation of ±5° F, the motor speed is increased to require only 10 minutes for the full stroke. Fig. 3 shows the relationship between the time required for full stroke as a function of resistance of the thermistor sensor 58, and the voltage applied to the motor as a function of resistance of the sensor.

The output of the amplifier 32 is also extended to the two level comparator circuit 36 which includes an amplifier stage including transistor Q9, a high comparator circuit 37 comprised of transistors Q7 and Q8, and a low comparator circuit 38 comprised of transistors Q5 and Q6. The comparator circuit 36, transistors Q5–Q9 may, for example, be formed of a single integrated circuit such as the RCA Type CA3096E. Transistor Q9 has a base connected to the junction of resistors R13 and R14 at point 35, which form a voltage divider connected between terminal 33 at the output of the amplifier 32 and ground. The collector of transistor Q9 is connected over a resistor R15 to +18 volts over conductor +V, and the emitter of transistor Q9 is connected over a resistor R17 to ground. Resistors R13–R17 bias transistor Q9 for operation as an inverting amplifier which inverts the signal at point 35, providing a signal which, when additively combined with the positive source potential 18 on conductor +V2, enables the collector of transistor Q9 to be at the same potential as output terminal 33 of the amplifier 32 when the potential at terminal 33 of the driver stage is at 9 volts. The collector potential increases or decreases about the 9 VDC center when the potential at terminal 33 decreases or increases, respectively.

The collector of transistor Q9 is connected over resistor R16 to the base of transistors Q8 and Q5 to extend the output of the inverting amplifier Q9 to the two level comparator circuits 37 and 38. Transistor Q8 has a collector connected over a resistor R18 to conductor +V and to the base of transistor Q7. Transistor Q7 has an emitter connected to the conductor +V and a collector connected to the output of the comparator circuit at point 68.

Transistor Q5 has a collector connected over a resistor R19 to ground and to the base of transistor Q6 which has an emitter connected to ground. The collector of transistor Q6 is connected to point 68 at the output of the comparator circuit 36.

The emitters of transistors Q8 and Q5 are connected together and to the junction of resistors R21 and R22 which form a voltage divider connected between conductor +V and ground for providing a 9-volt reference voltage for the two level comparator circuit 36 at the emitters of transistors Q5 and Q8. The signal output of the inverting amplifier Q9 must exceed the 9 volt reference plus the base-emitter voltage of NPN transistor Q8, or fall below the 9 volt reference minus the base-emitter voltage of transistor Q5, before the comparator circuit 36 effects energization of the motor 22. Thus, when the signal output at point 33 of the amplifier 32 increases from the 9-volt potential, the potential at the collector of transistor Q9 decreases causing the potential at the base of transistor Q5 to decrease below 9 volts. When the base-emitter voltage of transistor Q5 is exceeded, transistor Q5 turns on, causing transistor Q6 to turn on connecting ground to point 68 at the output of the comparator circuit 36. When the signal output at point 33 decreases, the potential at the collector of transistor Q9 increases causing the potential at the base of transistor Q8 to increase above 9 volts. When the base-emitter voltage of transistor Q8 is exceeded, transistor Q8 turns on causing transistor Q7 to turn on connecting +18 volts to point 68.

The positive and negative potentials provided at point 68 control the output switching circuits 39 to energize the motor 22 to permit modulation of the position of the dampers to correct for the temperature change in the area. Resistor R20, which is connected between point 68 and the bases of transistors Q8 and Q5, provides positive feedback to the inputs of the high and low comparator circuits to maintain the comparator circuits 37 or 38 enabled until the temperature in the area returns to the set point temperature. Resistors R20 and R16 form a hysteresis divider providing a potential at the input of the comparator circuits 37 and 38, which must be overcome by the output of transistor Q9 before the enabled comparator circuit 37 or 38 is disabled. The ratio of the values of resistors R16 and R20 is selected to prevent overshoot of the set point.

The output of the comparator circuit 36 at point 68 is connected over resistor R23 and limit switches 46 and 47 to the bases of transistors Q3 and Q4 which comprise the switching circuits 39 and 40. Transistor Q3, which is an NPN transistor, such as the RCA type 40326, is enabled by a positive signal (+18 volts) supplied by the high comparator circuit 37 at point 68 to connect +V to conductor 42, over resistor R24 and thus to terminal 42' of the motor 22 to energize the motor for rotation of the motor shaft in one direction. Transistor Q4, which is a PNP transistor, such as the RCA type 40319, is enabled in response to a ground potential provided at point 68 to connect ground to conductor 42 through resistor R25 and motor terminal 42' to effect energization of the motor 22 to provide rotation of the motor shaft in the opposite direction.

The motor is energized by the motor controller circuit 20 whenever the air temperature of the room changes at least ± 0.33° F. from the set point. The two level comparator circuit 36 and associated output switching circuits 39 and 40 are operable to apply a D.C. energizing voltage to the motor of either a positive or negative polarity for a decrease or increase in the temperature in the area.

FIG. 3 shows a plot of the amplitude of the voltage applied to the motor 22 as a function of resistance of the thermistor element of the temperature sensor 58. As shown in FIG. 3, the D.C. voltage ranges from approximately 2.5 to 11 volts positive (or negative) in response to a decrease (or increase) in the temperature, which causes an increase (or decrease) in the resistance of the thermistor element of the temperature sensor 58.

The operating characteristic for the controller circuit 20 has a dead band of approximately 13 ohms in width centered about a resistance value of approximately 2130 ohms. The 13 ohm dead band corresponds to a temperature change of ± 0.33° F. The dead band is provided by varying the gain of the inverting amplifier stage, including transistor Q9. The potential at the collector of the transistor Q9 must change by the base-emitter drop of transistor Q5 or transistor Q8 to trigger the motor on. This dead band in temperature is determined by the gain of the amplifier. The hysteresis forces the system back to the set point before the circuit triggers and shuts off. The dead band also prevents hunting for a balanced condition by requiring the 0.33° F change in temperature before the motor 22 can be energized.

FIG. 3 also shows the time required for the motor 22 to be driven a full stroke as a function of thermistor resistance. For a deviation of approximately ± 0.33° F., the motor is energized to run at its slowest speed, and for an increase or decrease of approximately 5° F. from the set point, the motor 22 is energized to run at its maximum speed.

As is shown in FIG. 3, for an 8-ohm increase in the resistance of the thermistor element of the temperature sensor 58, the controller circuit 22 applies a voltage of approximately +2.5 volts D.C. to the motor 22. For this level of energizing potential, the motor 22 requires approximately 100 minutes to be driven the full one-and-a-half inch stroke. When the resistance of the thermistor increases to approximately 2260 ohms, for example, a voltage of approximately 11 volts is applied to the motor 22, and the motor 22 is driven a full stroke in approximately 10 minutes.

The controller circuit 20 is operable over a 210 ohm portion of thermistor resistance over which range maximum positive and negative energizing voltages are supplied to the motor 22. Accordingly, the sensitivity of the thermistor element is approximately 21 ohms/° F.

OPERATION OF THE CONTROLLER ACTUATOR CIRCUIT

For purposes of illustration of the operation of the motor controller circuit 20, it is assumed the set for the area temperature sensor 58 is 70° F. It is pointed out that while a set point of 70° F. has been selected for the illustration of the operation of the motor controller circuit 22, response of the motor controller circuit 22 is the same for any set point such as 65° F., or 75° F., or some other value.

When the temperature in the area is at or near the set point value of 70° F., the bridge network 30 is balanced such that the error signal is zero and the output of the amplifier 32 is at +9 volts. Accordingly, the comparator circuit 36 is disabled and the motor 22 is de-energized When the air temperature of the area increase an amount greater than 0.33°F., the corresponding decrease in the resistance of the thermistor causes a decrease in the potential at input terminal 61 of the amplifier circuit 32 such that the potential at point 33 at the output of the amplifier 32 decreases from the 9 volt set point. Accordingly, the potential on conductor 43, which is connected to terminal 43' of the motor 22, also decreases. The drop in potential at point 33 is amplified and inverted by transistor Q9 and applied to the base of transistor Q8 over resistor R16, causing transistor Q8 to turn on which in turn causes transistor Q7 to conduct, connecting +18 volts to the output of the two level comparator circuit 36 at point 68. The voltage at point 68 is fed through resistor R20 to the base of transistor Q8 thus causing the comparator circuit 36 to drive point 68 to +V. The +18 volt potential at point 68 causes transistor Q3 to saturate applying a positive voltage to conductor 42 which is connected to terminal 42' of the motor 22. The voltage applied to the motor 22 is thus 18 volts, minus the drop across resistor R24, minus the output of the amplifier 32, with terminal 42' of the motor 22 being positive relative to terminal 43' of the motor.

Since the current draw of the D.C. motor 22 is relatively constant, maintaining a constant drop across resistor R24, the signal output of the amplifier 32 controls the voltage applied to the motor 22 and thus the speed of the motor. For a signal output of the amplifier 32 that is slightly below the +9 volt reference, the motor speed is minimum, and for a signal output approaching zero volts, the voltage across the motor 22 is greater and the speed of the motor 22 is maximum.

When the motor 22 is energized, the motor shaft is rotated driving the damper actuator 24 (FIG. 1) to modulate the warm and cold air dampers located in air ducts which supply conditioned air to the area such that the cold air damper is driven towards the fully open position while the warm air damper is driven towards the fully closed position, thereby increasing the amount of cool air supplied to the area to decrease the temperature in the area. As the temperature in the area begins to decrease, such temperature change is sensed by the temperature sensor 58 with the resistance of the thermistor element increasing, causing the bridge network 30 to return to a balanced condition. Accordingly, when the error signal approaches zero, the signal of the ampifier 32 approaches the +9 volt set point. As the signal output of the amplifier 32 starts to increase toward +9 volts, the voltage across the motor 22 is decreased and the motor 22 is driven at continually slower rates as the temperature in the area approaches the set point value of 70° F.

Transistor Q8 of the high comparator circuit 37 is maintained conductive by the positive feedback provided by resistors R20 and R16 until the signal output of the inverter transistor Q9 decreases to an amount sufficient to decrease the feedback voltage below the base-emitter drop for transistor Q8.

Due to the positive feedback provided by resistors R20 and R16, the motor 22 remains energized until the temperature in the area is approximately the set point value of 70° F., which corresponds to the center of the dead band shown in FIG. 3.

When transistor Q8 is cut off, transistors Q7 and Q3 are also cut off, removing the positive voltage from conductor 42, thereby de-energizing the motor 22 causing the motor to stop.

The motor controller circuit 20 responds in a similar manner for a decrease in the air temperature in the area such that amplifier 32 provides a positive going output signal (i.e. greater than 9 volts) at terminal 33 which is applied via conductor 43 to terminal 43' of the motor 22. The positive going signal is extended to inverter transistor Q9 causing transistors Q5, Q6 and Q4 to be rendered conductive to apply ground to conductor 42 and thus to terminal 42' of the motor 22. Thus, terminal 42' is negative relative to terminal 43', and the motor shaft is driven in the opposite direction to correct for the sensed temperature change. When the motor 22 is energized in response to a positive going error signal, the damper actuator 24 is driven to modulate the cold air damper toward a closed position and the warm air damper toward an open position to increase the temperature of the air supplied to the area. When the air temperature of the area increases to the set point of 70° F., the comparator circuit 38 is switched off, cutting off transistor Q4 to de-energize the motor 22.

I claim:

1. In a control system including a sensing device for monitoring a parameter of the system, a control circuit controlled by the sensing device to provide an output for controlling apparatus of the system to maintain the parameter at a predetermined set point value, said control circuit comprising first means controlled by said sensing device to provide an error signal which varies in amplitude and polarity from a reference value in accordance with changes in said parameter, and second means responsive to said error signal to effect the connection of a voltage of one polarity to a first output terminal of the control circuit whenever said error signal increases a predetermined amount relative to said reference value and to effect the connection of a voltage of the opposite polarity to said first output terminal whenever said error signal decreases a predetermined amount relative to said reference value, said error signal circuit whereby the amplitude of the potential difference between said first and second output terminals is proportional to the deviation of said error signal from the reference value and the polarity of the potential difference between said first and second output terminals is determined by the polarity of the error signal.

2. A system as set forth in claim 1 wherein said second means includes comparator means having means for establishing a turnon threshold for said comparator means to assure that said error signal has exceeded said predetermined amount before said comparator means is enabled.

3. A system as set forth in claim 2 wherein said comparator means includes means for establishing a turnoff threshold for said comparator means to maintain said comparator means enabled until said error signal reaches said turnoff threshold.

4. A system as set forth in claim 1 wherein said second means includes comparator means for comparing the error signal with a reference potential and for providing a first output signal whenever said error signal increases a predetermined amount relative to said reference potential and a second output signal whenever said error signal decreases a predetermined amount relative to said reference potential, and first and second switching means controlled by said first and second output signals, respectively, to connect said energizing voltages to said first circuit terminal.

5. A system as set forth in claim 1 wherein said first means includes a bridge network including said sensing device and an amplifier means controlled by said bridge network to provide an error signal indicative of changes in the parameter relative to the set point value.

6. A system as set forth in claim 1 wherein said control system includes a motor connected to said control circuit output terminals and operable when energized to control system apparatus to maintain the parameter at the set point value, the speed and direction of rotation of a shaft of the motor being controlled in accordance with deviations of the monitored parameter from the set point.

7. In a control system including a motor for controlling apparatus of the system to maintain a system parameter at a set point value, a sensing device for monitoring the parameter, and a motor controller circuit controlled by the sensing device to supply drive signals to the motor in response to changes in the value of the parameter relative to a setpoint value as sensed by the sensing device, said motor controller circuit comprising first means controlled by said sensing device to provide an error signals which varies in amplitude and polarity from a reference value in accordance with changes in said parameter, second means responsive to said error signal to effect the connecton of an energizing voltage of one polarity to a first terminal of the motor whenever said error signal increases a predetermined amount relative to said reference value and to effect the connection of an energizing voltage of the opposite polarity to said first terminal of the motor whenever said error signal decreases a predetermined amount relative to said reference value, said error signal being extended to a second terminal of the motor whereby the amplitude of the energizing voltage applied to the motor is proportional to the amount of deviation of said error signal from the reference value, and the polarity of the energizing voltage is determined by the polarity of the error signal.

8. A system as set forth in claim 7 wherein said second means includes comparator means having means for establishing a turnon threshold for said comparator means to assure that said error signal has exceeded said predetermined amount before said comparator means is enabled.

9. A system as set forth in claim 8 wherein said comparator means includes means for establishing a turnoff threshold for said comparator means to maintain said comparator means enabled until said error signal reaches said turnoff threshold.

10. A system as set forth in claim 7 wherein said second means includes comparator means for comparing the error signal with a reference potential and for providing a first output signal whenever said error signal increases a predetermined amount relative to said reference potential and a second output signal whenever said error signal decreases a predetermined amount relative to said reference potential, and first and second switching means controlled by said first and second output signals, respectively, to connect said energizing voltages to said first motor terminal.

11. A system as set forth in claim 10 wherein said comparator means includes first and second comparator circuits, means for establishing a reference potential for said first and second comparator circuits and inverter means connected to an output of said first means and responsive to said error signal to provide an enabling signal for said first and second comparator circuits, said first comparator circuit being enabled to provide said first output signal whenever said enabling signal decreases a predetermined amount relative to said reference potential and said second comparator circuit being enabled to provide said second output signal whenever said enabling signal increases a predetermined amount relative to said reference potential.

12. A system as set forth in claim 10 wherein said motor is energized to drive a shaft of said motor in one direction whenever an energizing voltage of one polarity is applied to the motor and energized to drive said shaft in the opposite direction whenever an energizing voltage of the opposite polarity is applied to the motor.

13. A system as set forth in claim 12 which includes motor limit switch means for disabling said first switching means to deenergize said motor whenever said shaft is driven a predetermined amount in said one direction and for disabling said second switching means to deenergize said motor whenever said shaft is driven a predetermined amount in said opposite direction.

14. A system as set forth in claim 7 wherein said first means includes amplifier means having an input amplifier stage, bias means for biasing said input amplifier stage to normally provide an error signal output at said reference level and an output driver stage controlled by the signal output of said input amplifier stage to supply drive current to said second motor terminal whenever an energizing voltage is applied to said first motor terminal.

15. A system as set forth in claim 7 wherein said system is an environmental control system, said monitored parameter is the air temperature in a given area, and said sensing device is a temperature sensor for sensing the air temperature in the area, said system apparatus including damper means controlled by said motor to effect compensation for changes in temperature by varying the amount of warm or cool air supplied to said area in accordance with changes in the temperature in the area as sensed by the sensing device.

16. A system as set forth in claim 15 wherein said motor is energized to be driven at a first speed whenever the error signal deviates from the reference value by a first amount and to be driven at a second, faster speed whenever the error signal deviates from the reference value by a second, larger amount.

17. In a control system including a motor having a shaft connected to apparatus of the system for controlling said apparatus to maintain a system parameter at a set point value, a sensing device for monitoring the parameter, and a motor controller circuit controlled by said sensing device to supply drive signals to the motor to effect rotation of a shaft of the motor between first and second limits in response to changes in the value of the parameter relative to a set point as sensed by the sensing device, said motor controller circuit comprising amplifier means controlled by said sensing device to provide an error signal which varies in amplitude and polarity from a reference value in accordance with changes in said parameter, comparator means including a first means responsive to said error signal to provide a first output signal whenever said error signal increases a predetermined amount from said reference value, and second means responsive to said error signal to provide a second output signal whenever said error signal decreases a predetermined amount from said reference value, first switching means enabled by said first output signal to connect an energizing potential of one polarity to a first terminal of said motor and second switching means enabled by said second output signal to connect an energizing potential of the opposite polarity to said first motor terminal, said error signal being extended to a second terminal of said motor, the amplitude of the energizing voltage applied to said motor being proportional to the amount of deviation of said error signal from the reference value, and the polarity of the energizing voltage being determined by the polarity of the error signal, whereby the speed and direction of rotation of said shaft are controlled in correspondence with deviations of the monitored parameter from the set point value.

18. A system as set forth in claim 17 wherein said comparator means includes means for establishing said reference potential, said first means includes a first comparator circuit enabled whenever said error signal increases a predetermined amount relative to said reference potential to provide said first output signal at an output of said comparator means, and said second means includes a second comparator circuit enabled whenever said error signal decreases a predetermined amount relative to said reference potential to provide said second output signal at said output of said comparator means.

19. A system as set forth in claim 18 wherein said comparator means includes feedback means connected between said output of said comparator means and inputs of said first and second comparator circuits for extending the outut signal provided at said output of said comparator means to said inputs of said first and second comparator circuits for establishing a turnoff threshold for said comparator circuits to thereby maintain said comparator circuits enabled until said error signal reaches said turnoff threshold.

20. A system as set forth in claim 17 wherein said switching means includes limit switch means having a first limit switch connected between said output of said comparator means and an input of said first switching circuit, and second limit switch means connected between said output of said comparator means and an input of said second switching means, the signal output of said comparator means normally being extended to said inputs of said first and second switching means over said limit switch means, said limit switch means being operable to effect deenergization of said motor whenever said motor shaft is driven to one of said limits.

21. A system as set forth in claim 17 wherein said motor controller circuit includes power supply means for providing an energizing voltage of a single polarity for said motor controller circuit.

\* \* \* \* \*

UNITED STATES PATENT OFFICE
CERTIFICATE OF CORRECTION

PATENT NO. : 3,976,925
DATED : August 24, 1976
INVENTOR(S) : George Rudich, Jr.

It is certified that error appears in the above-identified patent and that said Letters Patent are hereby corrected as shown below:

Column 10, line 13, after "signal" insert -- being extended to a second output terminal of said control --;

line 64, "signals" should be -- signal --.

Signed and Sealed this

Ninth Day of November 1976

[SEAL]

Attest:

RUTH C. MASON
Attesting Officer

C. MARSHALL DANN
Commissioner of Patents and Trademarks